June 11, 1957 H. OETIKER 2,795,438
PIN-DETENT SWIVEL COUPLING WITH LOCKING MEANS
Filed April 20, 1955 2 Sheets-Sheet 1
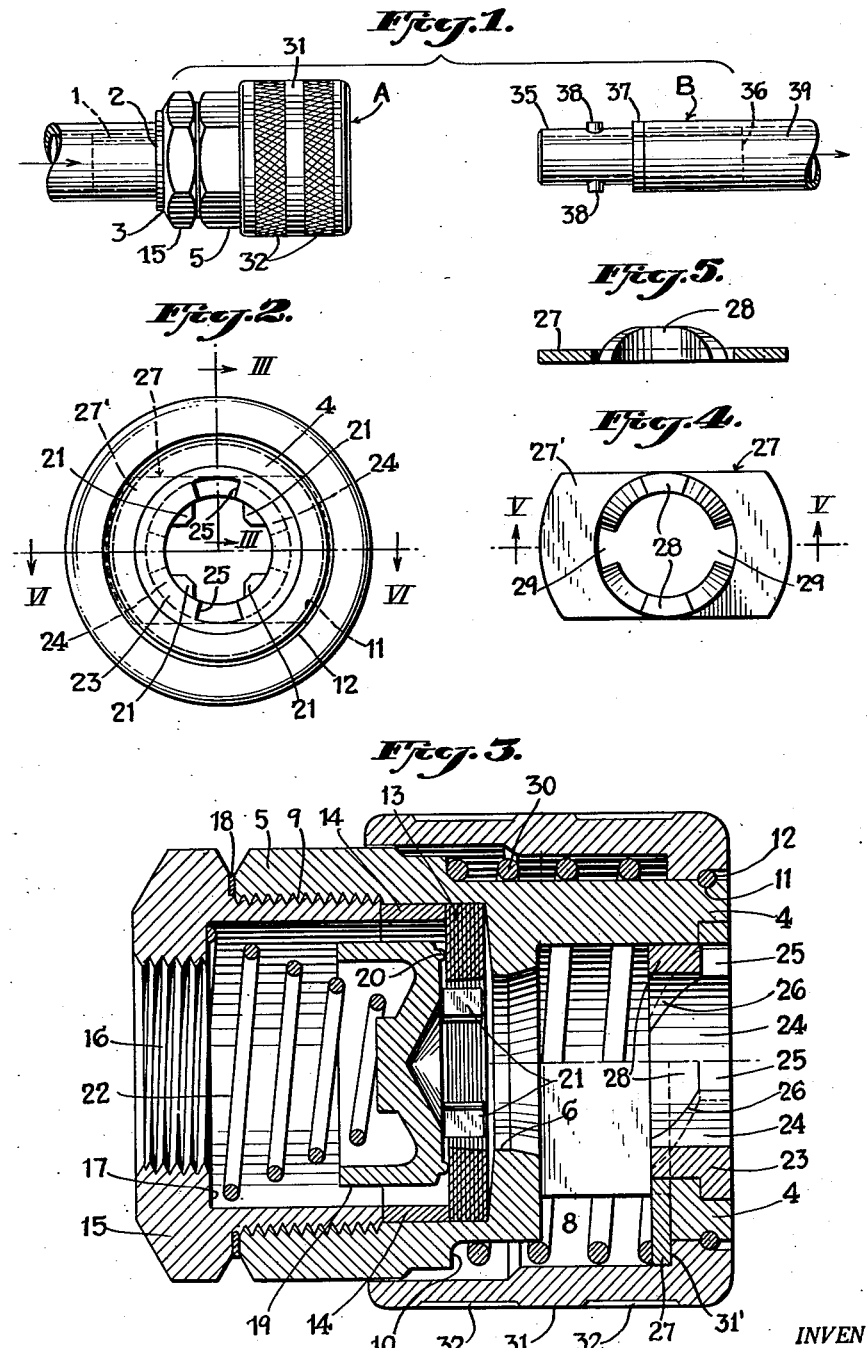
INVENTOR.
HANS OETIKER.
BY K. A. Mayr
ATTORNEY.

June 11, 1957  H. OETIKER  2,795,438
PIN-DETENT SWIVEL COUPLING WITH LOCKING MEANS
Filed April 20, 1955  2 Sheets-Sheet 2
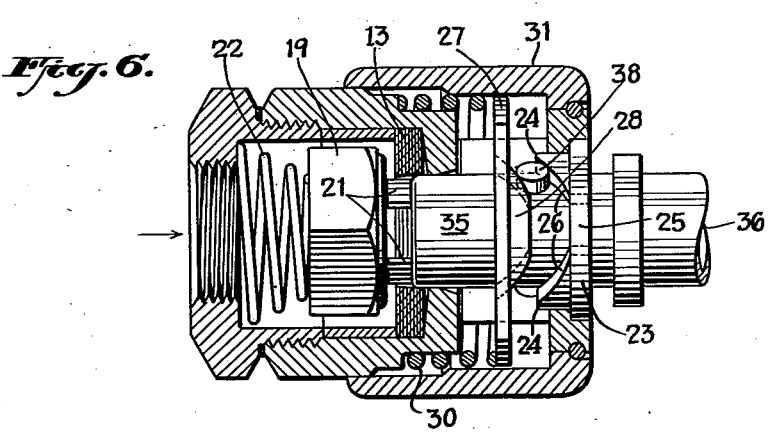
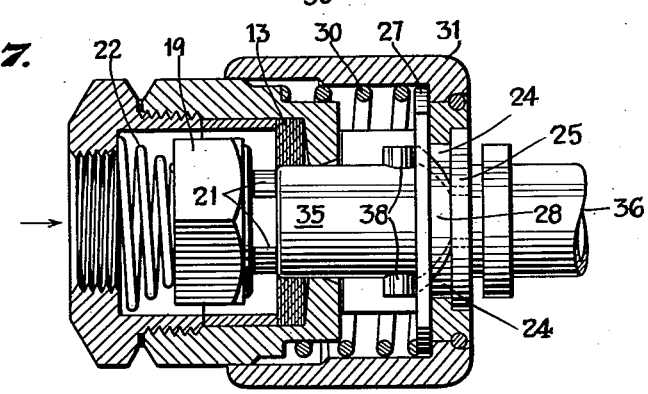
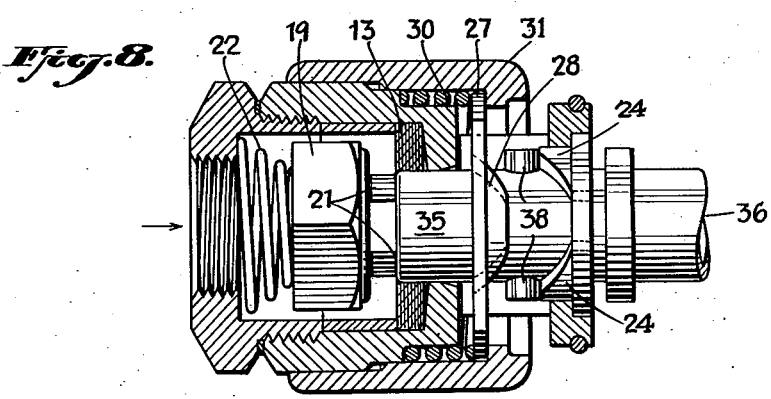
INVENTOR.
HANS OETIKER
BY K. A. Mayr
ATTORNEY.

United States Patent Office 2,795,438
Patented June 11, 1957

2,795,438
PIN-DETENT SWIVEL COUPLING WITH LOCKING MEANS

Hans Oetiker, Horgen, Switzerland

Application April 20, 1955, Serial No. 502,574

Claims priority, application Switzerland April 23, 1954

3 Claims. (Cl. 285—33)

The present invention relates to a coupling for disconnectably connecting high pressure tubing, more particularly to a coupling having one half provided with a spring loaded valve for automatically closing the end of the conduit or pipe to which the coupling half is connected and having another half provided with a nipple adapted to open the valve in the first coupling half upon connection of the coupling and affording closing of the valve upon disconnection of the coupling.

Conventional couplings of this type are not suitable for high pressure piping because the combined pressure of the high pressure fluid, for example compressed air, and of the spring for closing the valve is so great that too much force is required for inserting the nipple and connecting the coupling and simultaneously opening the valve. This necessitates provision and operation of a separate valve in connection with the coupling, complicating manipulation and increasing initial cost. The conventional systems, which are cumbersome, frequently cause loss of pressure fluid, if negligently operated. In plants in which high pressure pipe couplings are numerous the aforementioned disadvantages of conventional arrangements have a decisive economic and mechanical influence.

In the coupling according to the invention a locking element is provided which is pushed back against the action of a spring while the nipple is rotated along a helical guide during connection of the coupling and which is snapped back into its initial position when the protuberance of the nipple has reached the end of the helical guide, preventing sliding back of the protuberance and affording unhindered relative rotation of the nipple in the first coupling half without affecting the position of the valve. Means are provided for manually retracting the locking element against the action of the spring to unlock the nipple and affording sliding of the protuberance of the nipple along its guide. The aforesaid organization not only overcomes the disadvantages of conventional couplings but also provides the following additional advantages: After rotating insertion of the nipple, the latter is so locked that it can be rotated but not withdrawn. Since the locking element is actuated by the nipple itself, no safety levers and the like need be operated. A twisting of the connected flexible pipes is eliminated.

The novel features which are considered characteristic of the invention are set forth with particularity in the appended claims. The invention itself, however, and additional objects and advantages thereof will best be understood from the following description of an embodiment thereof when read in conjunction with the accompanying drawing, in which Fig. 1 is a small scale side view of the coupling according to the invention in disconnected position;

Fig. 2 is a front view of the first coupling half;

The left side and the upper right portion of Fig. 3 are a longitudinal section of the first coupling half, the section shown in the lower right portion of Fig. 3 being made along line III—III in Fig. 2;

Fig. 4 is a top view of the locking element;

Fig. 5 is a cross section of the locking element, the section being made along line V—V in Fig. 4;

Fig. 6 is a part longitudinal sectional view of the first coupling half taken along line VI—VI in Fig. 3, the nipple being shown in partly inserted position;

Fig. 7 is a view as Fig. 6 with the nipple fully inserted;

Fig. 8 is a view as Figs. 6 and 7 showing the locking element in unlocked position.

The same numerals designate the same parts in all figures.

Fig. 1 shows the first coupling half A and the nipple B in separated position. A compressed air hose 1 through which compressed air flows in the direction of the arrow is pulled over a socket 2 which is screwed into the first coupling half and sealed thereagainst by means of a packing 3.

The nipple which serves for conducting the compressed air in the direction of the arrow shown in Fig. 1, after connection of the parts A and B, consists of a straight tube having portions 35 and 36 between which a collar 37 is provided against which abuts the end of a hose 39 pushed over the tube portion 36. The tube portion 35 is provided with diametrically opposed pins or protuberances 38 whose function will be described later.

A coupling member 4 has a portion 5 of hexagonal cross section. The member 4 has a longitudinal central bore 6 through which the nipple can be inserted. The generally cylindrical member 4 has a rectangular transverse cutout 8. A sealing ring 13, preferably made of oil- and benzene-proof synthetic rubber, is inserted in the member 4 against which ring an annular rib 20 of a valve member 19 abuts until the nipple B is inserted into the coupling part A. A nut 15 having a thread 9 is screwed into the member 4 for pressing a sleeve 14 against the valve sealing ring 13. A metal sealing ring 18 is inserted between the member 4 and the nut 15. The socket 2 mentioned supra is screwed into the threaded bore 16 of the nut 15. The valve member 19 is pressed against the ring 13 by means of a conical spring 22, one end of which rests on an internal shoulder 17 of the nut 15 and the other end on the member 19. The latter is provided with four protuberances 21 against which the nipple may abut for pushing the valve member 19 to the left in Fig. 2 against the action of the spring 22.

An annular guide member 23 is rigidly connected with the member 4, two cylindrically bent and circumferentially spaced protuberances 24 extending from the member 23, leaving two passages 25 (Fig. 2) for receiving the protuberances 38 of the nipple B. The protuberances 24 form four helical guide surfaces 26 along which slide the protuberances 38 of the nipple 35, 36 when the parts A and B are assembled.

A locking member 27 cooperating with the guide member 23 and having a plate-like portion 27' axially movable and not rotatable in the cutout 8 is provided with two cylindrically bent and circumferentially spaced protuberances 28 which form an annular body with the protuberances 24 when the member 27 is pressed to the right side of the cutout 8 by means of a spring 30 inserted between an internal shoulder 10 of the member 4 and the member 27. The apexes or end surfaces of the protuberances 24 are placed in the spaces 29 between the protuberances 28 when the locking member is in locking position.

The spring 30 is covered by a sleeve 31 provided with knurls 32 on its outside and serving as a handle for unlocking the assembled parts A and B. A resilient ring 12 split at one point and resting in an annular groove 11 on the member 4 prevents separation of the sleeve 31 from the member 4. The sleeve 31 has an inwardly projecting shoulder or abutment 31', when pushed to the left, takes the locking member 27 along. The first coupling half A can be disassembled upon removal of the ring 12 and the nut 15.

The operation of the coupling will now be explained referring more particularly to Figs. 6 to 8 of the drawing:

For connecting the coupling, the free end of the nipple is inserted into the central bore of the first coupling half. Thereupon, the nipple is revolved in any one of two opposite directions, until the protuberances 38 enter the spaces 25 between the protuberances 24. The nipple is somewhat more advanced and revolved so that the protuberances 38 slide along the curved guide surfaces 26 of the protuberances 24. Since the latter are symmetric, it does not matter in which direction the nipple is revolved. When the protuberances 38 run on the guide surfaces 26, the front face of the nipple abuts against the protuberances 21 of the valve member 19 so that the nipple pushes the member 19 back against the action of the spring 22 and against the pressure of the compressed air. During this movement, the locking member 27, whose protuberances 28 rest on the protuberances 38, is also moved to the left. Fig. 6 shows the valve in half open position in which the nipple is not yet locked to the part A. The compressed air begins to flow through the coupling in the direction of the arrow. The internal diameter of the ring 13 should be somewhat smaller than the outside diameter of the nipple portion 35. The axial extension of the protuberances 21 is somewhat shorter than the thickness of the ring 13 so that the valve member 19 is not moved from its seat until the part 35 is sealed in the ring 13. Because of the greater extension of the valve opening motion in the device according to the invention, the force needed for opening the valve is smaller than in couplings in which the coupling parts are united by a straight motion. The revolving motion required for connecting the coupling according to the invention facilitates the coupling operation.

Upon continued revolving of the nipple, the protuberances 38 run on the apexes of the protuberances 24. The latter can now pass into the clearances 29 between the protuberances 28 of the locking member and the latter is returned to its initial position by the spring 30 (Fig. 7). The valve is now fully open and the nipple can be revolved without affecting the position of the valve because the protuberances 38 slide along the left surface (in Fig. 7) of the locking member 27 which, together with the apexes of the protuberances 24, forms a continuous annular surface. An accidental falling apart of the automatically locked coupling is impossible.

In order to disconnect the coupling, the sleeve 31 is pressed against the spring 30, after the nipple has been revolved until the protuberances 38 are on the apexes of the guiding protuberances 24 (Fig. 8). Marks may be provided on the coupling part A and/or on the nipple B to facilitate finding of the correct relative position of these parts. The protuberances 38 do not interfere with the movement of the sleeve 31 because there is enough space 29 between the protuberances 28 to afford passage of the protuberances 38 (Fig. 4). By turning the nipple through 90° and pulling on the nipple, the latter is released. The valve member 19, the sleeve 31, and the locking member 27 return automatically to their initial positions.

It is important that, due to the particular locking and interlocking means provided in the coupling according to the invention, the coupling cannot be disconnected by one hand. After the nipple has been inserted into the coupling member A, it can only be retracted by displacing the sleeve 31 by one hand and by revolving the nipple with the other hand. This is essential for couplings which are used for high pressure fluid piping because the end of a hose is thrown away with great force, which may cause serious accidents if, for example, the nipple unintentionally falls out of the coupling, for instance when the coupling is knocked against another object, or if the coupling can be disconnected by one hand only.

The invention is not limited to the particular construction illustrated and described. In certain cases, it may suffice to provide only one protuberance on the nipple and only one guide surface for the protuberance. Two guiding protuberances may be provided, each protuberance having only one guide surface, for example, if it is desired to completely utilize the available space for the longest possible guide path.

What is claimed is:

1. A coupling for disconnectably connecting high pressure tubing comprising a hollow coupling member having an end portion provided with a bore, a nipple adapted to be inserted through said bore into said coupling member, a sleeve axially movably fitted on said member, at least one protuberance radially extending from said nipple, said end portion having an annular cam adjacent to and coaxial of said bore and extending into said member, said cam having at least one flat end surface whose plane is at a right angle to the longitudinal axis of said member and having a sloped cam surface declining from at least one side of said end surface toward the axial outside of said member, at least one recess in said end portion, said recess extending radially of said bore at the end of each sloping surface which end is distal of said flat end surface, said recess affording passage of the protuberance of said nipple when inserting and withdrawing said nipple into and from said member, said coupling member having a transverse cutout which has an inside surface portion extending at a right angle to the longitudinal axis of said member, a locking plate axially movable in said cutout and being placed at a right angle to the longitudinal axis of said member, said locking plate having a bore adapted to receive said nipple and having at least one recess extending radially of the bore in said locking plate and affording passage of the protuberance of said nipple through said locking plate, an annular cam adjacent to the bore in said locking plate and having a cam surface shaped complementary to and engaging with said cam surface of said coupling member, the adjacent portions of said locking plate and of said end portion being complementary to each other so that the cam of said end portion projects through the recess of said locking plate and said flat end surface of the cam of said end portion lies flush with the inner face of said locking plate so as to form a substantially complete annular surface against which said nipple protuberance engages to prevent removal of said nipple from said end portion, said sleeve having an internal shoulder, and a spring placed in said sleeve and engaging said locking plate for pressing the latter against said shoulder, said spring permitting separation of said locking plate from said end portion of said coupling member for forming at least one sloped passage between the sloping surfaces of said cams of said coupling member and of said locking plate, said passage affording passage of the radial protuberance of said nipple when the latter is inserted into or withdrawn from said coupling member.

2. A coupling as defined in claim 1 in which said end portion of said coupling member includes an annular member, said bore, said annular cam, and said recess of said end portion being part of said annular member.

3. A coupling as defined in claim 1, in which two protuberances extend radially from said nipple, said protuberances being formed by two diametrically opposed pins, each of said annular cams having two diametrically opposed flat surfaces, said end portion of said coupling member having two diametrically opposed radially extending recesses, and said locking plate having two diametrically opposed radially extending recesses.

References Cited in the file of this patent

UNITED STATES PATENTS

| | | |
|---|---|---|
| 2,383,249 | Hardwick | Aug. 21, 1945 |
| 2,459,477 | Van Schuyver | Jan. 18, 1949 |
| 2,478,052 | Palm | Aug. 2, 1949 |